(12) United States Patent
Browning et al.

(10) Patent No.: US 7,941,788 B2
(45) Date of Patent: May 10, 2011

(54) OPERATING SYSTEM SUPPORT FOR THREAD-LEVEL BREAKPOINTS

(75) Inventors: Luke Matthew Browning, Austin, TX (US); Dean Joseph Burdick, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/689,003

(22) Filed: Mar. 21, 2007

(65) Prior Publication Data

US 2008/0235668 A1 Sep. 25, 2008

(51) Int. Cl.
G06F 9/44 (2006.01)
(52) U.S. Cl. .......................... 717/124; 717/127; 717/129
(58) Field of Classification Search .................. 717/124, 717/127, 129; 714/34
See application file for complete search history.

(56) References Cited

U.S. PATENT DOCUMENTS

| 5,632,032 | A  | * | 5/1997 | Ault et al. | 718/100 |
| 6,378,125 | B1 | * | 4/2002 | Bates et al. | 717/129 |
| 6,480,818 | B1 | * | 11/2002 | Alverson et al. | 703/26 |
| 6,708,326 | B1 | * | 3/2004 | Bhattacarya | 717/124 |
| 6,978,399 | B2 | * | 12/2005 | Bates et al. | 714/34 |
| 6,981,248 | B2 | * | 12/2005 | Bates et al. | 717/129 |
| 7,127,713 | B2 | * | 10/2006 | Davis et al. | 717/177 |
| 7,216,346 | B2 | * | 5/2007 | Bender et al. | 718/102 |
| 2005/0034024 | A1 | * | 2/2005 | Alverson et al. | 714/38 |
| 2005/0229163 | A1 | * | 10/2005 | Bates et al. | 717/129 |
| 2005/0246691 | A1 | * | 11/2005 | Hsieh et al. | 717/129 |
| 2006/0048098 | A1 | * | 3/2006 | Gatlin et al. | 717/124 |
| 2007/0150867 | A1 | * | 6/2007 | Barsness et al. | 717/124 |
| 2007/0168968 | A1 | * | 7/2007 | Bates et al. | 717/124 |

OTHER PUBLICATIONS

Schulz et al, "A ThreadAware Debugger with an Open Interface", 2000, ACM, pp. 201-211.*
Bhansali et al, "ramework for Instruction-level Tracing and Analysis of Program Executions", Jun. 14, 2006, ACM, pp. 154-163.*
"Best Threads Debugger Available", Etnus TotalView, Threads Debugger Features, Copyright Etnus, 2005, http://www.etnus.com/TotalView/Threads.html, 2 pages.

* cited by examiner

*Primary Examiner* — Emerson C Puente
*Assistant Examiner* — Charles Swift
(74) *Attorney, Agent, or Firm* — Yee & Associates, P.C.; Justin M. Dillon

(57) ABSTRACT

A computer implemented method, apparatus, and computer usable program code for processing breakpoints. A breakpoint is detected during execution of a process. A thread that is currently executing is identified as an identified thread. A determination is made as to whether the breakpoint is applicable to the identified thread. In response to the determination that the breakpoint is applicable to the identified thread, the execution of the process is halted. Execution of the process continues without halting execution of the process if the breakpoint is inapplicable to the identified thread.

13 Claims, 3 Drawing Sheets

OPERATING SYSTEM SUPPORT FOR THREAD-LEVEL BREAKPOINTS

BACKGROUND OF THE INVENTION

1. Field of the Invention

The present invention relates generally to an improved data processing system and in particular to a method and apparatus for executing instructions. Still more particularly, the present invention relates to a computer implemented method, apparatus, and computer usable program code for tracing processes during the execution of instructions.

2. Description of the Related Art

Debugging software is a methodical process for finding and reducing the number of bugs. Bugs are errors, flaws, mistakes, failures, or faults in computer software that prevent the software from behaving or executing as intended. Most bugs arise from mistakes and errors made by programmers either in the source code or design of the program. Some bugs are caused by compilers producing the incorrect code. Process tracing is one mechanism used for debugging software. With process tracing, one process attaches to another process. Operating systems, such as AIX® in UNIX®, support process tracing as a mechanism to monitor and control the execution of the process.

With debugging software, breakpoints are set in the traced processes. Breakpoints are instructions that are inserted into the executable instructions in the code of a traced process that allow the tracing process to be notified when the traced process has reached the point of execution identified by the breakpoint. These breakpoints are also referred to as breakpoint traps. When the traced process encounters a breakpoint, the traced process stops execution and notifies another program or software component. Typically, this notified software component is referred to as a handler or debugger. This debugger then analyzes data related to the execution of the process that has occurred. The debugger may generate results and notifications based on the analysis.

The instructions in the code where breakpoints are inserted are shared by all threads for a process. As a result, any breakpoint that is set for the process is visible to all of the threads of the process. This situation means that if any thread in the process hits the breakpoint, the entire process is stopped and the debugger is notified. In a multi-threaded process, it is common to only want to trace a subset of the threads that are present for the process.

Currently, this type of conditional breakpoint involves the debugger evaluating whether the thread that hit the breakpoint is the thread of interest when the process stops on the breakpoint. If the thread is not a thread of interest, the debugger replaces the breakpoint trap with the original instruction, single steps the thread to that instruction to execute the instruction, restores the breakpoint after the thread has executed the original instruction, and then allows the process to continue execution.

SUMMARY OF THE INVENTION

The illustrative embodiments provide a computer implemented method, apparatus, and computer usable program code for processing breakpoints. A breakpoint is detected during execution of a process. A thread that is currently executing is identified as an identified thread. A determination is made as to whether the breakpoint is applicable to the identified thread. In response to the determination that the breakpoint is applicable to the identified thread, the execution of the process is halted. Execution of the process continues without halting execution of the process if the breakpoint is inapplicable to the identified thread.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
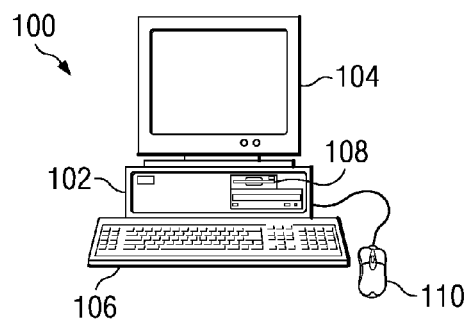
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
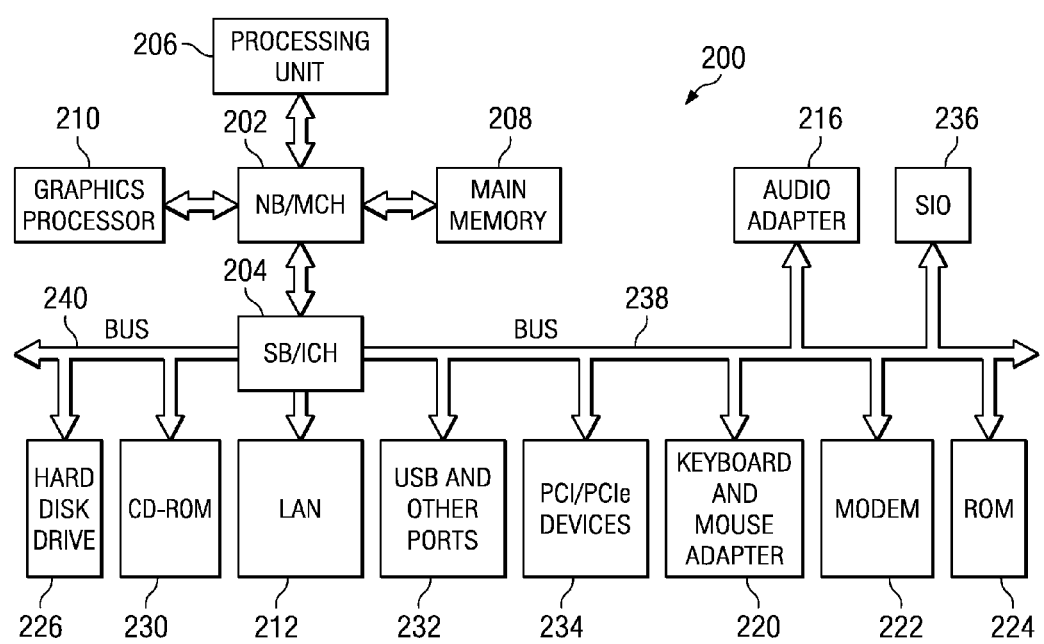
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Advanced Interactive Executive (AIX®) operating system, UNIX® operating system, or Microsoft® Windows XP®. AIX® operating system is an operating system available from International Business Machines Corporation. AIX® is a trademark of International Business Machines, Corporation. UNIX® is a trademark of The Open Group. Microsoft® and Windows XP® are trademarks of Microsoft Corporation in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments recognize that this type of "false-hit" processing is extremely inefficient because of state changes and inter-process communication that is involved between different components. The changes in states occur when processes are stopped and started and control is passed between different software components. For processes with large numbers of threads and few threads of interest, this type of conditional trap handling may be prohibitively slow.

The illustrative embodiments provide a computer implemented method, apparatus, and computer usable program code for processing breakpoints. In response to detecting a breakpoint during execution of the process, a thread that is currently executing is identified. A determination is made as to whether the breakpoint is applicable to the identified thread. If the breakpoint is applicable to the identified thread, execution of the process is halted. Otherwise, execution of the process continues without halting execution of the process. In other words, another process does not begin execution because the same process continues. Without halting execution of a process means that another process does not begin execution in place of the current process.

In this manner, the different embodiments do not halt the execution of the process unless the breakpoint is hit or encountered by a thread of interest. Additionally, a notification or passing control to a handler, such as a debugging process does not occur unless the breakpoint is applicable to the identified thread. In these examples, the threads of interest are maintained in a data structure. This data structure identifies threads for a particular process for each breakpoint that may be encountered. Each element of this list identifies the breakpoint forming a list of thread identifiers to which the breakpoint is applicable.

Figure 3:
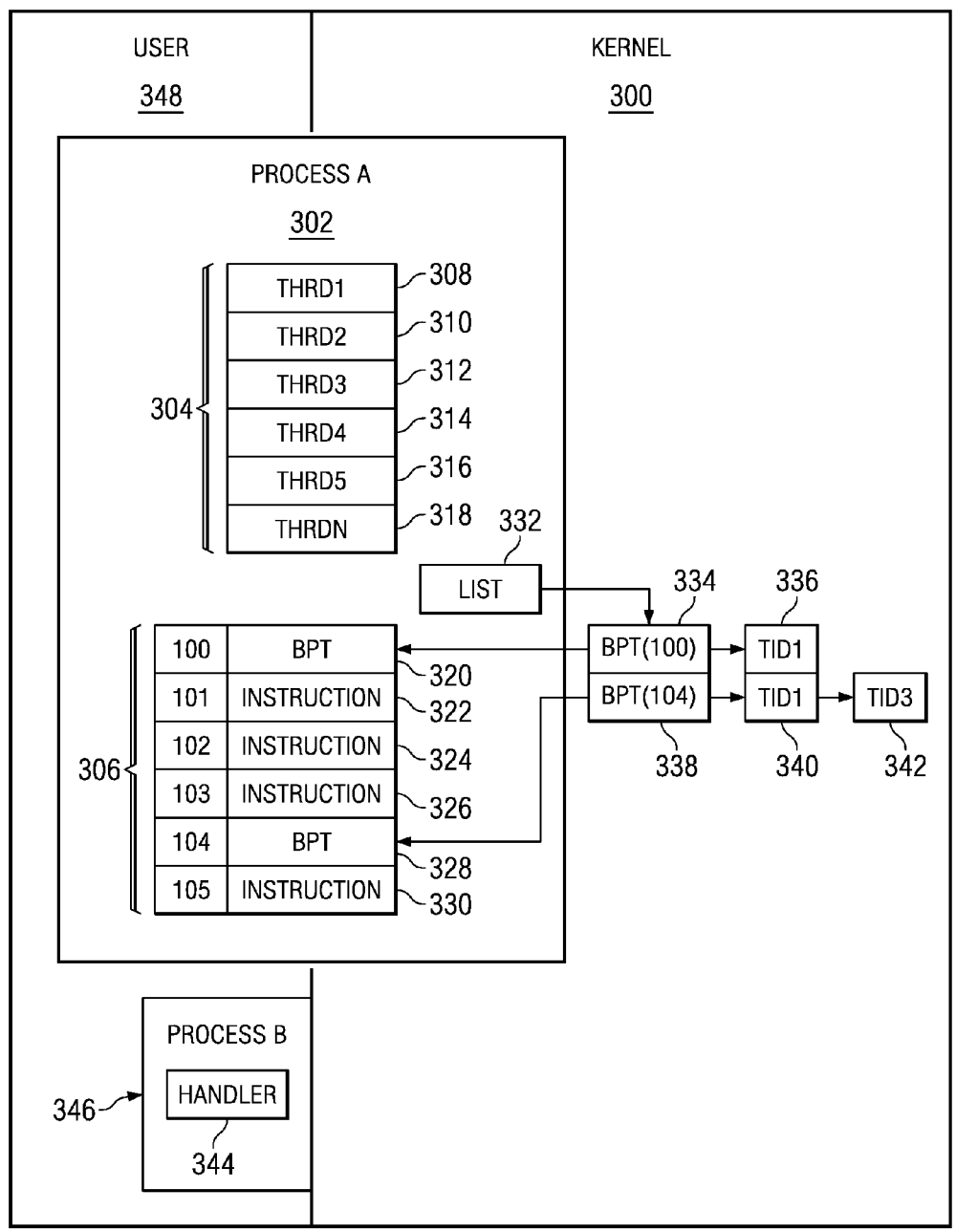
FIG. 3 is a diagram illustrating components used to provide operating support for thread-level breakpoint in accordance with an illustrative embodiment.

With reference now to FIG. 3, a diagram illustrating components used to provide operating system support for thread-level breakpoint is depicted in accordance with an illustrative embodiment. The different components illustrated in FIG. 3 may be implemented in a data processing system, such as data processing system 200 in FIG. 2.

In this example, kernel 300 is a central component of an operating system. The responsibilities of the kernel include, for example, managing resources in a data processing system and the communication between hardware and software components in the data processing system. In these illustrative examples, kernel 300 may execute code or instructions for process 302. Process 302 is a multi-threaded process containing threads 304 executing code 306. In these examples, threads 304 include threads 308, 310, 312, 314, 316, and 318. Code 306 contains instructions 320, 322, 324, 326, 328, and 330.

In these examples, instructions 320 and 328 are breakpoints. A processor executes instructions for process 302 until a breakpoint is encountered, such as instruction 320 or 328. In these examples, the breakpoint is a trap instruction, which generates an exception when the processor executes the trap instruction. When an exception is generated, control is passed to kernel 300. When given control, kernel 300 may then recognize that the executing process or thread has encountered a breakpoint, and conditionally stop process 302 before initiating any inter-process communication. This stopping of process 302 by kernel 302 is not considered halting execution of process 302 because kernel 300 is not another process that executes. The operating system, using kernel 300, controls execution of processes in a data processing system. If kernel 300 notifies another process to begin execution, then, process 302 is then considered to have halted execution.

In these illustrative examples, kernel 300 determines whether the breakpoint is a thread level breakpoint. This determination is made by determining whether the encountered breakpoint is present in list 332. If the breakpoint is present in list 332, then the breakpoint is considered a thread level breakpoint.

Kernel 300 determines whether a currently executing thread in threads 304 is a thread of interest. In this example, the thread of interest may be, for example, thread 312 in threads 304. This determination is made by using a data structure in the form of list 332 in these examples. List 332 is anchored within process 302. In this example, list 332 identifies breakpoints and threads of interest for each breakpoint in code 306. List 332 identifies threads of interest for the breakpoints that are encountered.

In this illustrative example, list 332 contains breakpoint identifier 334, which corresponds to instruction 320 within code 306. Breakpoint identifier 334 is associated with thread identifier 336, which corresponds to thread 308 in process 302 as a thread of interest. With respect to breakpoint identifier 338, this identifier is used to identify instruction 328. Thread identifiers 340 and 342 are identifiers for threads of interest for breakpoint identifier 338. In these examples, these thread identifiers point to threads 308 and 312.

If the currently executing thread is not a thread of interest, then kernel 300 replaces the breakpoint in the code 306 with the original instruction. The original instruction is the instruction in code 306 that was replaced by the breakpoint. For example, when the breakpoint for instruction 320 is encountered, this instruction is replaced with the original instruction if the currently executing thread is not a thread of interest. If thread 308 is currently executing, then this thread is not a thread of interest as identified through the data structures associated with list 332.

The thread is then manipulated to execute that single instruction, after which the breakpoint is reinserted, and execution is resumed. In these examples, the currently executing thread is "single stepped". In these examples, the single stepping may be implemented using a hardware instruction trace facility currently available in some PowerPC® processors which are available from International Business Machines Corporation. In this case, the thread resumes execution and the current process in which the thread is located continues to execute without halting because execution of a different process does not occur.

If the currently executing thread in threads 304 is a thread of interest as identified using list 332, kernel 300 then stops the execution of process 302. For example, if the currently executing thread is thread 312, when instruction 320 is encountered, list 332 identifies thread 312 as a thread of interest for the breakpoint for instruction 320.

Thereafter, kernel 300 passes control to handler 344 in process 346. In this example, the execution of this process halts and control is passed to another software component. In these examples, the execution of the process halts to begin execution of a process for a software component. This other software component is a different process that begins executing. Thus, the current process has halted execution. At this point, handler 344 executes "user" code. Handler 344 is a portion of code that is used to perform a specific task. The particular task depends on the implementation in these examples. This handler may be a debugging process used to identify and handle different errors that may occur. In these examples, threads 304 and code 306 are parts of process 302 that are visible both to user 348 and kernel 300. The location of list 332 is contained in process 302, but is only visible to kernel 300. List 332 and the associated breakpoint and thread identifiers are contained in the memory of kernel 300 and are not visible to user 348. In these examples, the original instruction that is overwritten when a breakpoint is set is stored in a breakpoint list entry within list 332 in these examples.

In this manner, the different illustrative embodiments avoid performance degradation that occurs when a process, such as process 302, is halted and restarted when breakpoints are reached for threads that are not threads of interest. The different illustrative embodiments reduce the number of state changes in inter-process communication that are needed to handle breakpoints at a thread level. In these examples, the determination of whether a false-hit has occurred is performed entirely within kernel 300 without requiring a process level stop or notification of a handler.

In these examples, all threads to which a breakpoint applies are stopped while processing of the current breakpoint is performed to avoid missing a potential or expected breakpoint being encountered by another thread in the process. The threads are then restarted after the processing of the current breakpoint occurs. Further, in the illustrative examples, the processing of breakpoints is serialized at the process level because the kernel modifies process and global data, such as the code. If a thread encounters a breakpoint while another thread in the process is handling a false-hit, that new thread is suspended until the processing of the other breakpoint completes.

Figure 4:
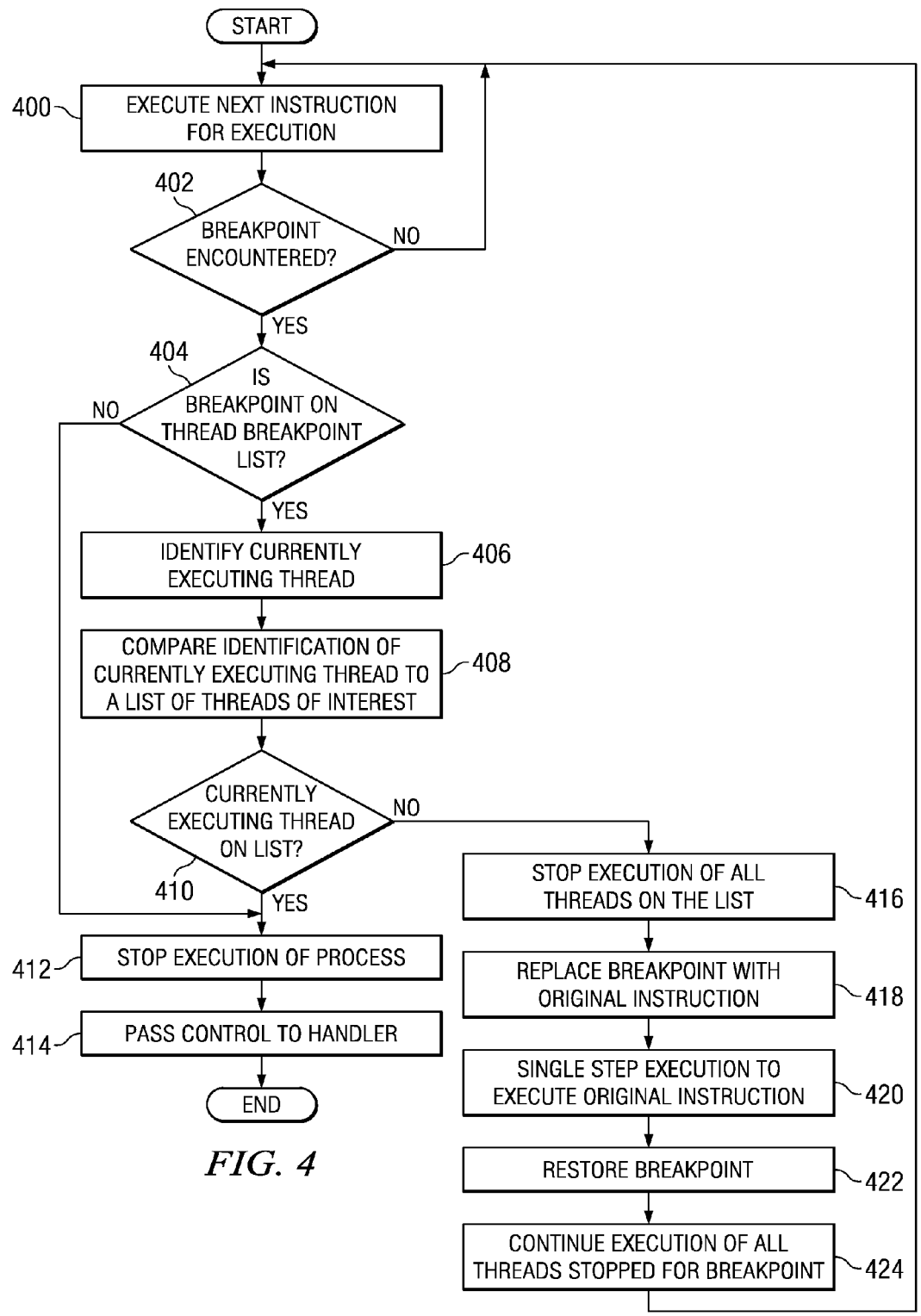
FIG. 4 is a flowchart of a process for processing breakpoints in accordance with an illustrative embodiment.

Turning now to FIG. 4, a flowchart of a process for processing breakpoints is depicted in accordance with an illustrative embodiment. The process in FIG. 4 may be implemented in a processor and software component, such as kernel 300 in FIG. 3.

The process begins by executing the next instruction (step 400). A determination is made as to whether a breakpoint is encountered (step 402). In these examples, the breakpoint takes the form of an instruction that is identified by the kernel as one for a breakpoint rather than a normal instruction. If a breakpoint is not encountered in step 402, the process then returns to step 400. Steps 400 and 402 are performed by the processor executing the instructions.

If a breakpoint is encountered in step 402, control is passed to the kernel. The kernel determines whether the breakpoint is on a thread breakpoint list (step 404). This determination is made by comparing the breakpoint to a list, such as list 332 in FIG. 3. If the breakpoint is on the list, the currently executing thread is identified (step 406).

Thereafter, the identification of the currently executing thread is compared to a list of threads of interest (step 408). The list in step 408 is similar to list 332 in FIG. 3. Next, a determination is made as to whether the currently executing thread is on the list (step 410). If the currently executing thread is on the list, the currently executing thread is a thread of interest. In this case, the execution of the process stops (step 412), and control is passed to a handler (step 414) with the process terminating thereafter.

With reference again to step 410, if the currently executing thread is not on the list, the currently executing thread is not a thread of interest. In that case, the execution of all threads on the list is stopped (step 416). Then, the breakpoint is replaced with the original instruction (step 418). Thereafter, the execution of the thread is single stepped to execute the original instruction (step 420). The breakpoint is restored after the original instruction is executed (step 422). Next, the execution of all threads stopped for the breakpoint is continued (step 424) with the process returning to step 400 thereafter.

The restoring of the breakpoint allows for the exception or trap handling to occur during later execution of the code In other words, the breakpoint remains in effect. With reference again to step 404, if the breakpoint is not on the list, the process then proceeds to step 412 as described above.

In the illustrative embodiments, the kernel processes the breakpoint to determine if the breakpoint is a thread-specific breakpoint and whether the currently executing thread is a thread of interest, before passing control to a handler and initiating inter-process communications.

Steps 416, 418, and 420 are part of the false-hit processing that occurs in the illustrative embodiments. During processing of this step, the execution of other threads that are on the list for the breakpoint that is encountered are stopped. Threads that are not on the list for the current breakpoint will also be suspended during processing of the breakpoint if they happen to hit another breakpoint during that time. By halting execution of other threads on the list, the process avoids having another thread in the process missing this breakpoint in execution. Halting execution of threads that hit breakpoints during breakpoint processing is used to serialize breakpoint processing at the process level. The execution of the other threads on the list is continued when steps 418, 420, and 422 are completed in these examples.

In these illustrative examples, breakpoints may be removed using a deferred allocation scheme. For example, when all of the threads on a breakpoint list have terminated, the breakpoint may be marked as stale. In this implementation, the breakpoint is not de-allocated when the threads terminate execution. Instead, the thread is removed from the list that the breakpoint is left as being set to mark it as stale. The next time a thread encounters the breakpoint, that thread sees that the breakpoint is on the list with an empty thread and then de-allocates the breakpoint at that time.

Thus, the different illustrative embodiments provide a computer implemented method, apparatus, and computer usable program code for managing breakpoints on a thread-level for a process. When a breakpoint is detected during execution of the process, the thread that is currently executing is identified. A determination is made as to whether the breakpoint is applicable to the identified thread. If the breakpoint is applicable to the identified thread, execution of the process halts. Thereafter, the control may be passed to the handler, which may be a debugging process. The handler may be code (instructions) within the same process, or another process (a debugger). If the breakpoint is not applicable to the identified thread, the breakpoint is replaced with an instruction for execution. The instruction is then executed and the breakpoint is restored within the code.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing breakpoints by an operating system kernel, the computer implemented method comprising:

the operating system kernel, without further interaction with a debugger, performing steps including:

responsive to detecting a breakpoint during execution of a process, identifying, a thread that is currently executing as an identified thread;

retrieving a data structure comprising an identification of the breakpoint and a list of identifiers for threads for which the breakpoint is applicable;

determining whether the breakpoint is applicable to the identified thread based on comparing an identifier for the identified thread to the list of identifiers of the data structure; and responsive to a determination that the breakpoint is applicable to the identified thread, halting execution of the process, responsive to a determination that the breakpoint is not applicable to the identified thread, halting, execution of the threads identified in the list of identifiers, replacing the breakpoint with an instruction, executing the instruction after replacing the breakpoint, restoring the breakpoint after executing the instruction, and resuming execution of the threads identified in the list of identifiers.

2. The computer implemented method of claim 1 further comprising:
passing control to a debugging process after halting execution of the process, wherein a breakpoint hit has occurred.

3. The computer implemented method of claim 1, wherein the steps for halting execution of the threads identified in the list of identifiers, are performed without halting execution of the process; and
wherein the steps for halting execution of the threads identified in the list of identifiers additionally comprise suspending execution, by the operating system kernel, of a set of subsequent threads that encounter a subsequent breakpoint and resuming execution of the set of subsequent threads after the steps for resuming execution of the threads identified in the list of identifiers.

4. The computer implemented method of claim 1, wherein the breakpoint is a trap instruction.

5. The computer implemented method of claim 1 further comprising:
responsive to a termination of all threads for the breakpoint, removing all identifications of the thread; and
responsive to a subsequent thread encountering the breakpoint, removing the breakpoint.

6. The computer implemented method of claim 1, wherein the breakpoint is a thread level breakpoint.

7. A computer program product comprising:
a computer readable medium storing computer usable program code for an operating system kernel for processing breakpoints by the operating system kernel without further interaction with a debugger, the computer program readable medium comprising:
computer usable program code, responsive to detecting a breakpoint during execution of a process, for identifying a thread that is currently executing as an identified thread;
computer usable program code for retrieving, a data structure comprising an identification of the breakpoint and a list of identifiers for threads for which the breakpoint is applicable;
computer usable program code for determining whether the breakpoint is applicable to the identified thread based on comparing an identifier for the identified thread to the list of identifiers of the data structure; and
computer usable program code, responsive to a determination that the breakpoint is applicable to the identified thread, for halting execution of the process;
computer usable program code, responsive to a determination that the breakpoint is not applicable to the identified thread, for halting, by the operating system kernel, execution of the threads identified in the list of identifiers, replacing the breakpoint with an instruction, executing the instruction after replacing the breakpoint, restoring the breakpoint after executing the instruction, and resuming execution of the threads identified in the list of identifiers.

8. The computer program product of claim 7 further comprising:
computer usable program code for passing control to a debugging process after halting execution of the process, wherein a breakpoint hit has occurred.

9. The computer program product of claim 7, wherein the steps for halting execution of the threads identified in the list of identifiers, are performed without halting execution of the process; and
wherein the steps for halting execution of the threads identified in the list of identifiers additionally comprise suspending execution of a set of subsequent threads that encounter a subsequent breakpoint and resuming execution of the set of subsequent threads after the steps for resuming execution of the threads identified in the list of identifiers.

10. The computer program product of claim 7, wherein the breakpoint is a trap instruction.

11. A data processing system comprising:
a bus;
a communications unit connected to the bus;
a storage device connected to the bus, wherein the storage device includes computer usable program code for use by an operating system kernel; and
a processor unit connected to the bus, wherein the processor unit executes the computer usable program code, by the operating system kernel, without further interaction with a debugger, to identify a thread that is currently executing as an identified thread in response to detecting a breakpoint during execution of a process; retrieve a data structure comprising an identification of the breakpoint and a list of identifiers for threads for which the breakpoint is applicable; determine whether the breakpoint is applicable to the identified thread based on comparing an identifier for the identified thread to the list of identifiers of the data structure; and halt execution of the process in response to a determination that the breakpoint is applicable to the identified thread, and responsive to a determination that the breakpoint is not applicable to the identified thread, halt execution of the threads identified in the list of identifiers, replace the breakpoint with an instruction, execute the instruction after replacing the breakpoint, restore the breakpoint after executing the instruction, and resume execution of the threads identified in the list of identifiers.

12. The data processing system of claim 11, wherein the processor unit further executes the computer usable program code to pass control to a debugging process after halting execution of the process, wherein a breakpoint hit has occurred.

13. The data processing system of claim 11, wherein the steps for halting execution of the threads identified in the list of identifiers, are performed without halting execution of the process; and
wherein the steps for halting execution of the threads identified in the list of identifiers additionally comprise suspending execution, by the operating system kernel, of a set of subsequent threads that encounter a subsequent breakpoint and resuming execution of the set of subsequent threads after the steps for resuming execution of the threads identified in the list of identifiers.

* * * * *